(12) United States Patent
Im

(10) Patent No.: US 9,186,964 B2
(45) Date of Patent: Nov. 17, 2015

(54) DOOR FRAME FOR VEHICLE

(71) Applicant: Hyundai Motor Company, Seoul (KR)

(72) Inventor: Sang Young Im, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 6 days.

(21) Appl. No.: 14/105,117

(22) Filed: Dec. 12, 2013

(65) Prior Publication Data

US 2015/0130214 A1     May 14, 2015

(30) Foreign Application Priority Data

Nov. 8, 2013 (KR) .................... 10-2013-0135397

(51) Int. Cl.
| | |
|---|---|
| *E05D 15/16* | (2006.01) |
| *B60J 5/04* | (2006.01) |
| *B60J 10/04* | (2006.01) |
| *B60R 13/04* | (2006.01) |

(52) U.S. Cl.
CPC .............. *B60J 5/0402* (2013.01); *B60J 5/0405* (2013.01); *B60J 5/0463* (2013.01); *B60J 10/042* (2013.01); *B60R 13/04* (2013.01)

(58) Field of Classification Search
CPC ...... B60J 5/0402; B60J 10/042; B60J 5/0411; B60R 3/04
USPC ............... 49/502, 440, 441; 296/146.1, 146.5
See application file for complete search history.

(56) References Cited

U.S. PATENT DOCUMENTS

| | | | | |
|---|---|---|---|---|
| 5,317,835 | A * | 6/1994 | Dupuy et al. ................. | 49/441 |
| 7,410,203 | B2 * | 8/2008 | Yatsuda et al. ............. | 296/146.2 |
| 7,854,094 | B2 * | 12/2010 | Zimmer et al. ............... | 49/440 |
| 8,782,954 | B2 * | 7/2014 | Kawai et al. ................. | 49/475.1 |
| 8,819,997 | B2 * | 9/2014 | Bouvatier ..................... | 49/492.1 |
| 8,950,121 | B2 * | 2/2015 | Inaba et al. .................... | 49/502 |
| 2001/0001917 | A1 * | 5/2001 | Goto ............................. | 49/440 |
| 2004/0244298 | A1 * | 12/2004 | Ogawa et al. ................. | 49/502 |
| 2011/0061307 | A1 * | 3/2011 | Braeuherr .................... | 49/475.1 |
| 2011/0099912 | A1 * | 5/2011 | Ohtake et al. ................ | 49/502 |
| 2011/0296763 | A1 * | 12/2011 | Lee et al. ..................... | 49/493.1 |
| 2012/0091746 | A1 * | 4/2012 | Zimmer et al. ............... | 296/93 |
| 2012/0174491 | A1 * | 7/2012 | Clark et al. ................. | 49/490.1 |
| 2012/0247026 | A1 * | 10/2012 | Sato ............................ | 49/493.1 |

FOREIGN PATENT DOCUMENTS

| | | | |
|---|---|---|---|
| DE | 3538562 A1 * | 11/1985 | |
| EP | 2243650 A2 * | 10/2010 | ........... B60J 10/00 |
| JP | 2004-082760 B2 | 3/2004 | |

(Continued)

*Primary Examiner* — Jerry Redman
(74) *Attorney, Agent, or Firm* — Morgan, Lewis & Bockius LLP

(57) ABSTRACT

A door frame for a vehicle for ensuring aesthetic features of the vehicle, reducing the production cost, and minimizing the entire weight may be coupled with a bright molding providing for improving aesthetic features of a vehicle and a door glass run guiding open/close of a door glass. The door frame may include: one outer frame at which the bright molding is mounted; and one inner frame disposed at an internal side compared with the outer frame, coupled with the outer frame. The door glass run may be interposed and coupled between a glass run supporting portion formed at the bright molding and a glass run contact portion formed at the outer frame, and the bright molding may be directly mounted to the outer frame without an additional member.

9 Claims, 4 Drawing Sheets

(56) References Cited

FOREIGN PATENT DOCUMENTS

| JP | 2004-322957 B2 | 11/2004 |
| JP | 2010-254103 A | 11/2010 |
| KR | 1999-0015351 U | 5/1999 |
| KR | 10-0795035 B1 | 1/2008 |
| WO | WO 2012132504 A1 * | 10/2012 |

\* cited by examiner

DOOR FRAME FOR VEHICLE

CROSS-REFERENCE TO RELATED APPLICATION

The present application claims priority of Korean Patent Application Number 10-2013-0135397 filed Nov. 8, 2013, the entire contents of which application is incorporated herein for all purposes by this reference.

BACKGROUND OF INVENTION

1. Field of Invention

The present invention relates to a door frame for a vehicle. More particularly, the present invention relates to a door frame for a vehicle which is formed so as to couple with a bright molding.

2. Description of Related Art

Generally, a door frame for a vehicle is a window frame which is mounted to a door of a vehicle. That is, a door frame for a vehicle is a frame which is formed to surround a door glass. Further, a door glass run is mounted at a door frame for a vehicle so as to guide opening/closing of the door glass.

A door frame for a vehicle may be coupled with a bright molding. Herein, the bright molding is exposed to the outside of the vehicle and is mounted at the outside of a door frame of the vehicle. In addition, the bright molding may be manufactured by various designs for improving the aesthetic features of a vehicle.

Conventionally, it is not easy for a shape of a door frame for a vehicle to be changed according to a shape of the bright molding. In addition, additional constituent elements are required for coupling the bright molding formed in various shapes in the state of not changing a shape of a door frame for a vehicle. For example, a plastic member is disposed between a door frame for a vehicle and the bright molding such that it is possible to couple a door frame for a vehicle with the bright molding. Further, the bright molding can be coupled with a door frame for a vehicle by using a member such as a rivet.

However, engagement composition for coupling a door frame for a vehicle with the bright molding is complex and the production cost is increased if the additional constituent elements are used. In addition, weight of the door frame that the bright molding coupled therewith is increased. Meanwhile, even if the additional constituent elements are used, strong coupling of a door frame for a vehicle and the bright molding of which shapes are different from each other is limited.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a door frame for a vehicle having advantages of ensuring aesthetic features of a vehicle, reducing production cost, and minimizing entire weight.

In addition, various aspects of the present invention provide for a door frame for a vehicle having further advantages of easily coupling with a bright molding without an additional coupling member.

Various aspects of the present invention provide for a door frame for a vehicle that may be coupled with a bright molding providing for improving aesthetic features of a vehicle and a door glass run guiding open/close of a door glass. The door frame may include: one outer frame at which the bright molding is mounted; and one inner frame disposed at an internal side compared with the outer frame, coupled with the outer frame. The door glass run may be interposed and coupled between a glass run supporting portion formed at the bright molding and a glass run contact portion formed at the outer frame, and the bright molding may be directly mounted to the outer frame without an additional member.

The outer frame may include: a molding mounting portion surface contacting with the bright molding; and a hemming portion formed at one end of the molding mounting portion, and hemmed to a part of the inner frame. The glass run contact portion may be bent and extended from the other end of the molding mounting portion toward an internal direction of vehicle, and a hole into which a part of the bright molding may be inserted is formed at the glass run contact portion.

The bright molding may include: a frame contact portion surface contacting the molding mounting portion of the outer frame; a first extending portion bent and extended from one end of the frame contact portion toward an internal direction of the vehicle, and formed so as to surround the one end of the molding mounting portion and the part of the hemming portion; and a second extending portion bent and extended from the other end of the glass run supporting portion toward an internal direction of the vehicle, and adapted such that a part thereof is inserted into the hole. The glass run supporting portion may be adapted such that one end thereof is connected with the other end of the frame contact portion and the other end thereof is extended in a shape of a U and contacts the door glass run.

A blocker may be formed for blocking one end of the molding mounting portion at the first extending portion, and a part of the second extending portion inserted into the hole may be formed so as to block one side of the hole.

A plastic having elastic force may be disposed between the blocker of the first extending portion and the one end of the molding mounting portion.

A part of the door glass run may be formed so as to surround the glass run supporting portion and be extended along an external surface of the bright molding.

A width of the bright molding exposed to the outside may be determined according a length of the door glass run extended along an external surface of the bright molding.

The bright molding and a plastic having elastic force may be integrally formed by an injection molding after the bright molding is formed by roll forming.

The plastic may be injection-molded so as to entirely surround the bright molding, and a width of the bright molding exposed to the outside may be determined by cutting the plastic.

The plastic disposed between one end of the bright molding and a vehicle body may form a lip which is protruded toward the vehicle body.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
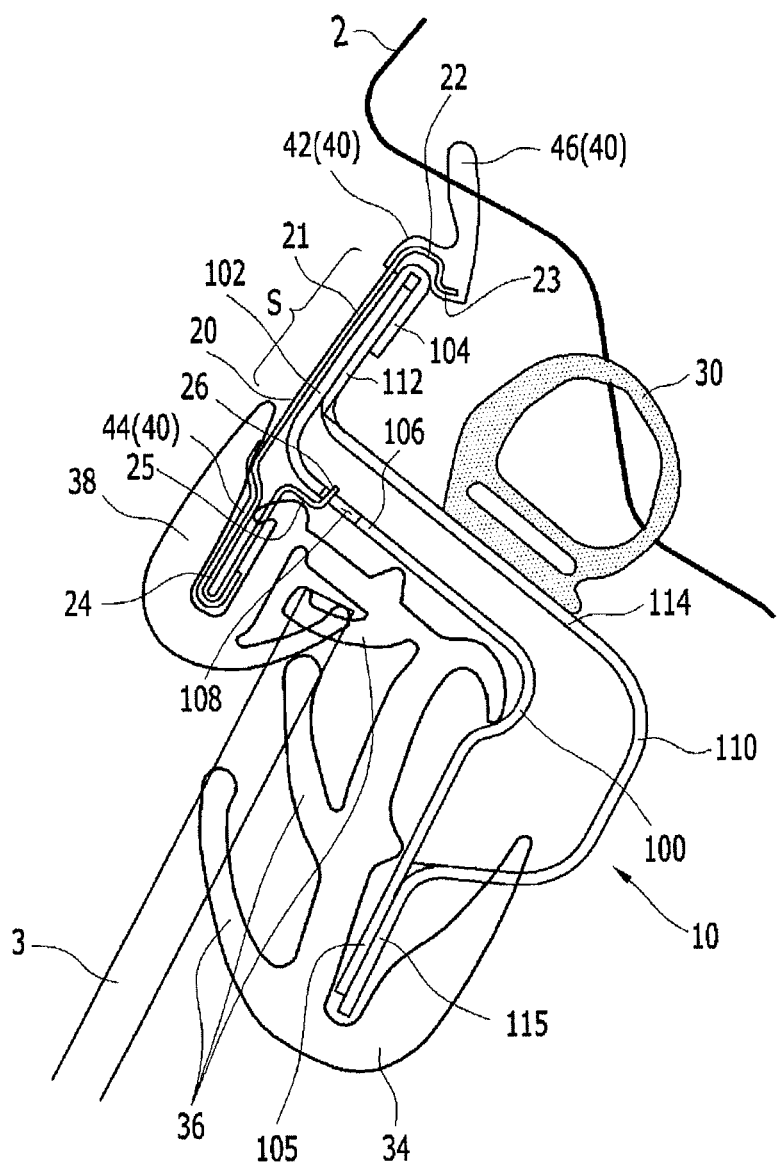
FIG. 1 is a cross-sectional view of an exemplary door frame for a vehicle according to the present invention.

FIG. 1 is a cross-sectional view of a door frame for a vehicle according to various embodiments of the present invention.

As shown in FIG. 1, a door frame 10 for a vehicle according to various embodiments of the present invention includes an outer frame 100 and an inner frame 110. In addition, the door frame 10 is coupled with weather strips 30 and 34 and a bright molding 20.

The outer frame 100 is the door frame 10 which is disposed at the outside of the vehicle in the state that the door of the vehicle is closed, and the inner frame 110 is the door frame 10 which is disposed at the inside of the vehicle in the state that the door of the vehicle is closed. In addition, the outer frame 100 and the inner frame 110 are respectively and independently formed and are coupled with each other.

As the outer frame 100 and the inner frame 110 are independently formed and then are coupled with each other, design freedom of the door frame 10 can be improved. Particularly, design freedom of a portion where the bright molding 20 is mounted can be improved.

In detail, the bright molding 20 is directly mounted at a part of the outer frame 100, and the part of the outer frame 100 is variously formed according to a shape of the bright molding 20. At this time, the inner frame 110 is variously formed according to a shape of the outer frame 100 and is coupled with the outer frame 100 so as to increase strength of the portion where the bright molding 20 is mounted.

In FIG. 1, a vehicle body 2 and a door glass 3 are additionally shown. That is, the state of closing a door and a door glass 3 of a vehicle is shown in FIG. 1.

The door frame 10 is disposed between the vehicle body 2 and the door glass 3 in the state that the door and the door glass 3 of a vehicle are closed such that the vehicle body 2 is closed with the door glass 3. In addition, the weather strips 30 and 34 are respectively disposed between the door frame 10 and the vehicle body 2 and between the door frame 10 and the door glass 3.

The weather strips 30 and 34 include a door weather strip 30 and a door glass run 34.

The door weather strip 30 is a weather strip which is disposed between the door frame 10 and the vehicle body 2 closed with the door in the state of closing the door of the vehicle.

The door glass run 34 is a weather strip which is disposed between the door frame 10 and the door glass 3 in the state of closing the door glass 3. In addition, a plurality of lips 36 which contact the door glass 3 are formed at the door glass run 34. Furthermore, the door glass run 34 guides open/close of the door glass 3.

Herein, the weather strips 30 and 34 are rubber packing which is installed on edges of the door such that air outside of the vehicle or external noise does not flow into the vehicle. The weather strips 30 and 34 are well known to a person of ordinary skill in the art such that a detailed description thereof will be omitted.

The bright molding 20 is a portion which is exposed to the outside of the vehicle and is mounted for improving the aesthetic features of the vehicle. In addition, the bright molding 20 can be manufactured in various shapes according to design of the vehicle.

Hereinafter, the outer frame 100 at which the bright molding 20 is mounted, the inner frame 110 with which the outer frame 100 is coupled, and the door glass run 34 and the bright molding 20 which are mounted at the outer frame 100 and the inner frame 110 will be described in detail.

The outer frame 100 includes a molding mounting portion 102, a hemming portion 104, a glass run contact portion 106, and a mounting hole 108.

The molding mounting portion 102 is a portion where the bright molding 20 is mounted. The molding mounting portion 102 is bent according to a shape of the bright molding 20 such that the bright molding 20 is directly mounted. The molding mounting portion 102 has a uniform width so as to have one surface which contacts the bright molding 20.

The hemming portion 104 is formed at one end of the molding mounting portion 102. In addition, the hemming portion 104 surrounds a part of the inner frame 110.

The glass run contact portion 106 is bent and extended from the other end of the molding mounting portion 102 toward an inside direction of the vehicle. The glass run contact portion 106 may be formed in various shapes by a person of ordinary skill in the art such that the door glass run 34 is easily mounted at the glass run contact portion 106. That is, the glass run contact portion 106 may be bent such that the door glass run 34 is easily mounted.

The mounting hole 108 is a hole which is formed at the glass run contact portion 106. In addition, the mounting hole 108 is formed such that a part of the bright molding 20 penetrates it. Further, the mounting hole 108 is formed to close with the other end of the molding mounting portion 102.

Herein, an internal surface defines a surface which is coupled with the inner frame 110 of the outer frame 100, and an external surface defines an opposite surface. This definition has a same meaning with reference to an external direction and an internal direction a the vehicle.

The inner frame 110 includes a coupling portion 112 and an extending portion 114.

The coupling portion 112 is a part which is surrounded by the hemming portion 104 of the outer frame 100, of the inner frame 110. That is, the coupling portion 112 of the inner frame 110 is hemmed by the hemming portion 104 of the outer frame 100 such that the outer frame 100 is coupled with the inner frame 110. In addition, the coupling portion 112 is hemmed in the one end of the molding mounting portion 102 and is adapted to have a uniform width so as to surface contact an internal surface of the molding mounting portion 102.

The extending portion 114 is bent and extended from the coupling portion 112 toward an internal direction of a vehicle. In addition, the extending portion 114 forms the door frame 10 as one surface of the extending portion 114 contacts one surface of the glass run contact portion 106. Herein, the one surface of the extending portion 114 will be called "outer frame contacting surface 115", and the one surface of the glass run contact portion 106 will be called "inner frame contacting surface 105". Meanwhile, the extending portion 114 may be formed in various shapes by a person of ordinary skill in the art such that the door weather strip 30 may be easily mounted at a part of the extending portion 114 between the extending portion 114 and the vehicle body 2.

Meanwhile, a part of the door glass run 34 is formed to surround the outer frame contacting surface 115 and the inner frame contacting surface 105.

The bright molding 20 includes a frame contact portion 21, a first extending portion 22, a first blocker 23, a glass run supporting portion 24, a second extending portion 25, and a second blocker 26.

The frame contact portion 21 is a portion which contacts one surface of the molding mounting portion 102 formed at the outer frame 100. In addition, the frame contact portion 21 has a uniform width so as to surface contact the molding mounting portion 102.

The first extending portion 22 is bent and extended from one end of the frame contact portion 21 toward an internal direction of vehicle. In addition, the first extending portion 22 is formed so as to surround one end of the molding mounting portion 102 and a part of the hemming portion 104.

The first blocker 23 is formed at the first extending portion 22. In addition, the first blocker 23 is formed to surround the part of the hemming portion 104. The bright molding 20 is prevented from escaping from the outer frame 100 as one end of the molding mounting portion 102 where the hemming portion 104 is formed is blocked by the first blocker 23.

The glass run supporting portion 24 is extended in a shape of a "U" from the other end of the frame contact portion 21. In addition, the glass run supporting portion 24 is a portion where the frame contact portion 21 is further extended over the width of the molding mounting portion 102 surface contacting the frame contact portion 21. If a portion which is connected with the other end of the frame contact portion 21 is one end of the glass run supporting portion 24, the other end of the glass run supporting portion 24 is bent in a shape of a "U" and is then extended to near the molding mounting portion 102. Meanwhile, the glass run supporting portion 24 supports the door glass run 34 and prevents the door glass 3 from escaping from the door frame 10.

The second extending portion 25 is bent and extended from the other end of the glass run supporting portion 24 extended to near the other end of the molding mounting portion 102 toward an internal direction of the vehicle. That is, the second extending portion 25 is extended in the same direction as the glass run contact portion 106 of the outer frame 100.

The second blocker 26 is formed at the second extending portion 25 so as to hook one side surface of the mounting hole 108. In addition, the second blocker 26 hooks the mounting hole 108 such that the bright molding 20 is prevented from escaping from the outer frame 100.

As described above, the door glass run 34 is disposed between the glass run contact portion 106 and the glass run supporting portion 24. In addition, the glass run contact portion 106 and the glass run supporting portion 24 are formed in shapes which are formed for easily mounting the door glass run 34 by a person of ordinary skill in the art. Further, an additional shape of the glass run contact portion 106 for mounting the door glass run 34 and preventing the door glass 3 from escaping is not required according to the door glass run 34 being mounted between the glass run contact portion 106 and the glass run supporting portion 24. Thus, the shape of the outer frame 100 can be simple.

Meanwhile, the bright molding 20, the outer frame 100, and the inner frame 110 may be formed by roll forming.

Herein, the roll forming is a method which is often used when a plate or a frame bent in a complex shape is manufactured, and the method is well known to a person of ordinary skill in the art such that a detailed description thereof will be omitted.

The bright molding 20 further includes a plastic portion 40.

The plastic portion 40 is integrally formed with the bright molding 20 by injection molding after the bright molding 20 is formed by roll forming. The plastic portion 40 is injected to entirely surround the bright molding 20 (e.g., molded with the bright molding in situ) and then is cut as necessary. Further, the plastic portion 40 is formed of a plastic material having elastic force. That is, the plastic portion 40 may be formed of a material such as rubber.

The plastic portion 40 is separated to a first plastic portion 42 and a second plastic portion 44 by cutting.

The first plastic portion 42 surrounds the first extending portion 22 and the first blocker 23 of the bright molding 20. In addition, the first plastic portion 42 further surrounds a part of the frame contact portion 21 connected with the first extending portion 22. The first plastic portion 42 functions such that the molding mounting portion 102 smoothly passes the first blocker 23 and is easily positioned at the first extending portion 22 when the bright molding 20 is mounted at the outer frame 100.

The first plastic portion 42 forms a skin lip 46. The skin lip 46 is protruded toward the vehicle body 2 closed by the door and contacts the vehicle body 2. In addition, the skin lip 46 is exposed to the outside of the vehicle between the bright molding 20 and the vehicle body 2. Furthermore, it is possible to remove a lip which is required to be formed at the door weather strip 3 and extended to between the bright molding 20 and the vehicle body 2 according to the skin lip 46 being formed at the first plastic portion 42. Therefore, a shape of the door weather strip 30 can be simple.

The second plastic portion 44 surrounds the glass run supporting portion 24 of the bright molding 20. The second plastic portion 44 further surrounds a part of the frame contact portion 21 that is connected with the glass run supporting portion 24.

An amount of the first plastic portion 42 and the second plastic portion 44 surrounding the frame contact portion 21 is regulated by regulating an amount of cutting the plastic portion 40 between the first plastic portion 42 and the second plastic portion 44. That is, the width S of the bright molding 20 which is exposed is regulated according to an amount of cutting the plastic portion 40.

The door glass run 34 further includes an external lip 38.

The external lip 38 is extended from the door glass run 34 so as to surround the glass run supporting portion 24 of the bright molding 20 surrounded by the second plastic portion 44. The external lip 38 is further extended so as to further surround a part of the frame contact portion 21 connected with the glass run supporting portion 24. The width S of the bright molding 20 which is exposed is secondly regulated according to a length that the external lip 38 is extended if the external lip 38 is further extended over the second plastic portion 44 surrounding a part of the frame contact portion 21.

Herein, the bright molding 20 may be formed of as SUS material (e.g., stainless steel or other suitable materials), and the plastic portion 40 may be formed of a PVC material. Colors of the bright molding 20 and the plastic portion 40 may be predetermined considering the aesthetic features by a person of ordinary skill in the art.

Hereinafter, the simple composition of a door frame for a vehicle according to various embodiments of the present invention will be described referring to FIG. 2 to FIG. 4.

Figure 2:
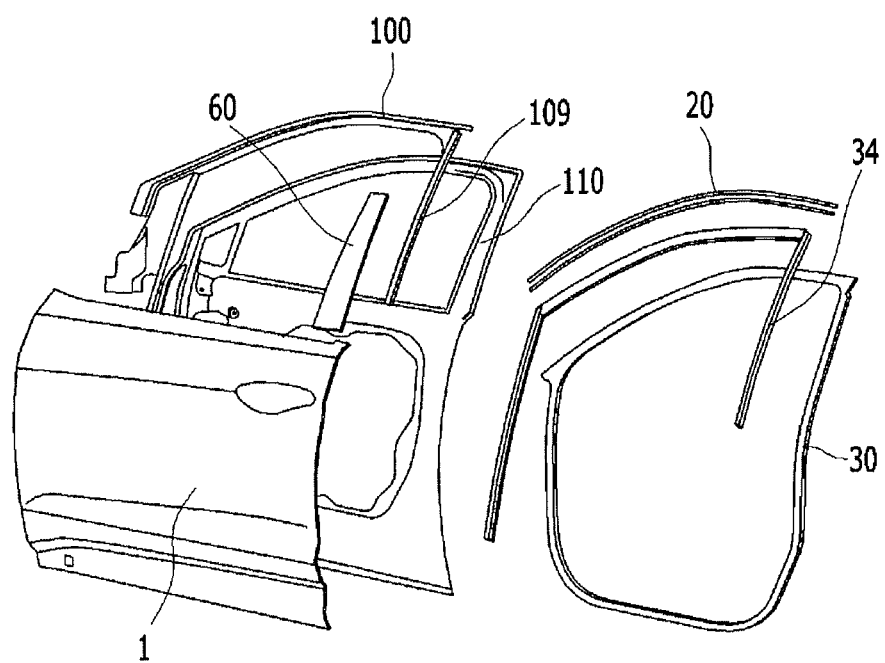
FIG. 2 is an exploded view of an exemplary door frame for a vehicle according to the present invention.
Figure 3:
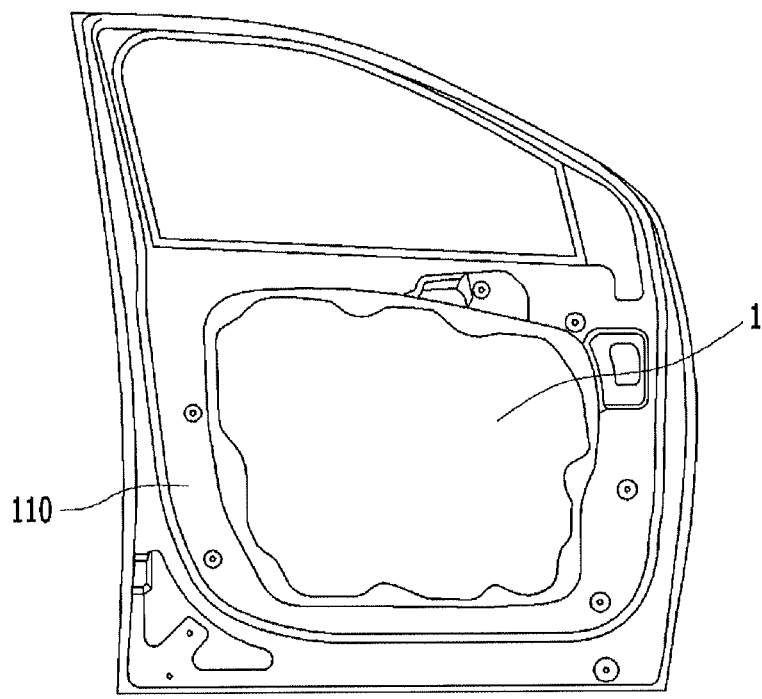
FIG. 3 is an internal view of an exemplary door frame for a vehicle according to the present invention.
Figure 4:
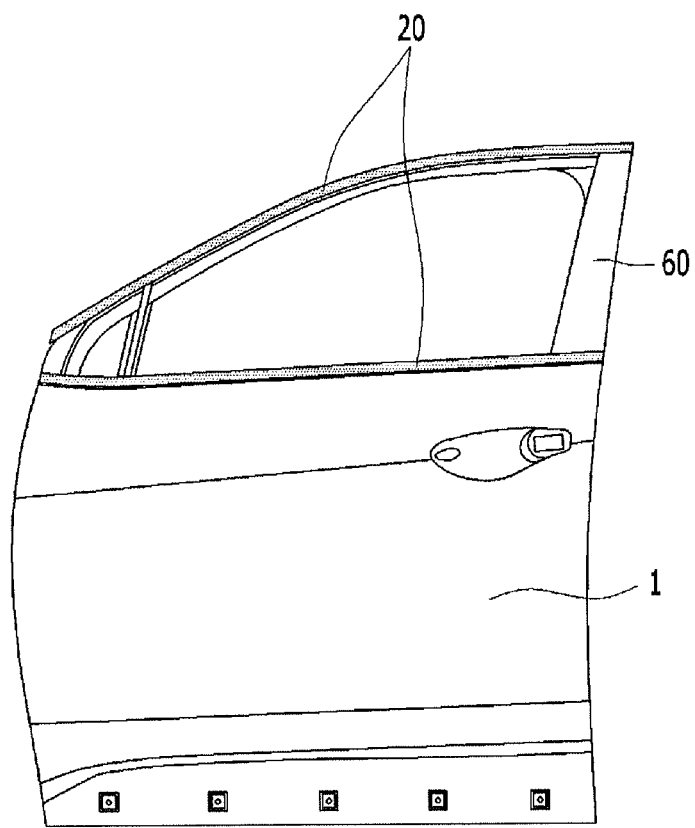
FIG. 4 is an external view of an exemplary door frame for a vehicle according to the present invention.

FIG. 2 is an exploded view of a door frame for a vehicle according to various embodiments of the present invention, FIG. 3 is an internal view of a door frame for a vehicle according to various embodiments of the present invention, and FIG. 4 is external view of a door frame for a vehicle according to various embodiments of the present invention.

As shown in FIG. 2 to FIG. 4, a door frame for a vehicle 10 according to various embodiments of the present invention is composed of the one piece of outer frame 100 and the one piece of inner frame 110. Therefore, the aesthetic features of a vehicle can be improved when a door is opened.

A door panel 1 coupled with the door frame 10 has structure in which a pillar portion is removed. In addition, the bright molding 20 which is not integrally formed with the door glass run 34 is applied, and tape 60 is stuck to a B pillar 109 to which the bright molding 20 is not applied. Furthermore, the bright molding 20 is also applied to an upper end of the door panel 1. Therefore, the bright molding 20 can realize a surround molding surrounding both front and rear door glasses 3, and simultaneously weight can be lightened and the production cost can be reduced. The surround molding is well known to a person of ordinary skill in the art such that a detailed description thereof will be omitted.

According to various embodiments of the present invention, engagement composition of the bright molding 20 and the door frame 10 can be simple as additional constituent elements are not used and the bright molding 20 is directly coupled with the door frame 10. Therefore, the entire weight can be lightened. In addition, the aesthetic features can be ensured and improved according to the bright molding 20 being exposed instead of the door frame 10, and simultaneously it is possible for the width of the exposed bright molding 20 to be regulated. Further, the shape of door frame 10 can be simple, additional constituent elements for coupling the bright molding 20 with the door frame 10 may be removed, and the production cost can be reduced as the shape of the door weather strip 30 becomes simple.

For convenience in explanation and accurate definition in the appended claims, the terms upper, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door frame for a vehicle comprising:
    a bright molding for improving aesthetic features of the vehicle;
    a door glass run guiding opening and closing of a door glass;
    a outer frame at which the bright molding is mounted; and
    a inner frame disposed at an internal side compared with the outer frame, coupled with the outer frame;
    wherein the door glass run is interposed and coupled between a glass run supporting portion formed at the bright molding and a glass run contact portion of the outer frame, and the bright molding is mounted to the outer frame, and,
    wherein the outer frame comprises:
        a molding mounting portion surface contacting the bright molding; and
        a hemming portion formed at one end of the molding mounting portion, and
    hemmed to a part of the inner frame, and
    wherein the glass run contact portion is bent and extended from another end of the molding mounting portion toward an internal direction of the vehicle, and the glass run contact portion includes a hole into which an end of the bright molding is inserted.

2. The door frame of claim 1, wherein the bright molding comprises:
    a frame contact portion surface contacting the molding mounting portion of the outer frame;
    a first extending portion bent and extended from one end of the frame contact portion toward an internal direction of the vehicle, and formed so as to surround the one end of the molding mounting portion and a portion of the hemming portion; and
    a second extending portion bent and extended from another end of the glass run supporting portion toward an internal direction of the vehicle, and adapted such that a portion thereof is inserted into the hole,
    wherein the glass run supporting portion is adapted such that one end thereof is connected with another end of the frame contact portion and the another end thereof is extended in a shape of a U and contacts the door glass run.

3. The door frame of claim 2, wherein a blocker is formed for blocking the one end of the molding mounting portion at the first extending portion, and the portion of the second extending portion inserted into the hole is formed so as to block one side of the hole.

4. The door frame of claim 3, wherein a plastic having elastic force is disposed between the blocker of the first extending portion and the one end of the molding mounting portion.

5. The door frame of claim 1, wherein a portion of the door glass run is formed so as to surround the glass run supporting portion and is extended along an external surface of the bright molding.

6. The door frame of claim 5, wherein a width of the bright molding exposed to an outside is determined according a length of the door glass run extended along an external surface of the bright molding.

7. The door frame of claim 1, wherein the bright molding and a plastic having elastic force are integrally formed by an injection molding after the bright molding is formed by roll forming.

8. The door frame of claim 7, wherein the plastic is injection-molded so as to entirely surround the bright molding, and a width of the bright molding exposed to an outside is determined by cutting the plastic.

9. The door frame of claim 7, wherein the plastic disposed between one end of the bright molding and a vehicle body forms a lip which is protruded toward the vehicle body.

* * * * *